United States Patent [19]

Glennon

[11] Patent Number: 4,684,873

[45] Date of Patent: Aug. 4, 1987

[54] HYBRID GENERATING SYSTEM

[75] Inventor: Timothy F. Glennon, Rockford, Ill.

[73] Assignee: Sundstrand Corporation, Rockford, Ill.

[21] Appl. No.: 779,995

[22] Filed: Sep. 25, 1985

[51] Int. Cl.$^4$ .................. H02K 16/00; H02P 9/00
[52] U.S. Cl. .................................. 322/47; 290/6;
307/16; 307/84; 310/114; 322/90
[58] Field of Search ............... 322/29, 32, 49–52,
322/89, 90; 307/16, 75, 76, 84; 310/112–114;
290/6

[56] References Cited

U.S. PATENT DOCUMENTS

| 2,500,730 | 3/1950 | Yonkers | 322/52 X |
|---|---|---|---|
| 2,892,098 | 6/1959 | Bergvall | 307/84 |
| 3,267,353 | 8/1966 | Franklin | 322/90 |
| 3,459,980 | 8/1969 | Coroller | 310/114 |
| 3,530,366 | 9/1970 | Schwarm | 322/90 X |
| 3,730,573 | 5/1973 | Vance | 307/84 X |
| 4,424,464 | 1/1984 | Ikegami | 307/16 X |
| 4,447,737 | 5/1984 | Cronin | 290/6 |
| 4,476,395 | 10/1984 | Cronin | 310/112 X |
| 4,554,501 | 11/1985 | Baker | 307/16 X |

Primary Examiner—R. J. Hickey

Attorney, Agent, or Firm—Wood, Dalton, Philips, Mason & Rowe

[57] ABSTRACT

Prior types of generating systems for producing AC and DC output power have utilized integrated drive generators for producing the AC power and means for rectifying the AC power developed by the drive generator to produce the DC power. However, such types of systems encounter various disadvantages, including less than desirable reliability of the DC power, distortion in the AC power caused by rectification thereof to produce the DC power and reduced efficiency. In order to overcome these problems, a hybrid generating system according to the present invention comprises an AC power generating section driven by a prime mover for generating AC output power and a DC power generating section independent of the AC power generating section, also driven by the prime mover for generating the DC output power wherein each of the AC and DC power generating sections includes a permanent magnet generator. The AC and DC power generating sections may be provided in a common housing to provide a compact hybrid generating system in which reliability and efficiency are increased and distortion in the AC output power caused by generation of the DC output power is eliminated.

14 Claims, 3 Drawing Figures

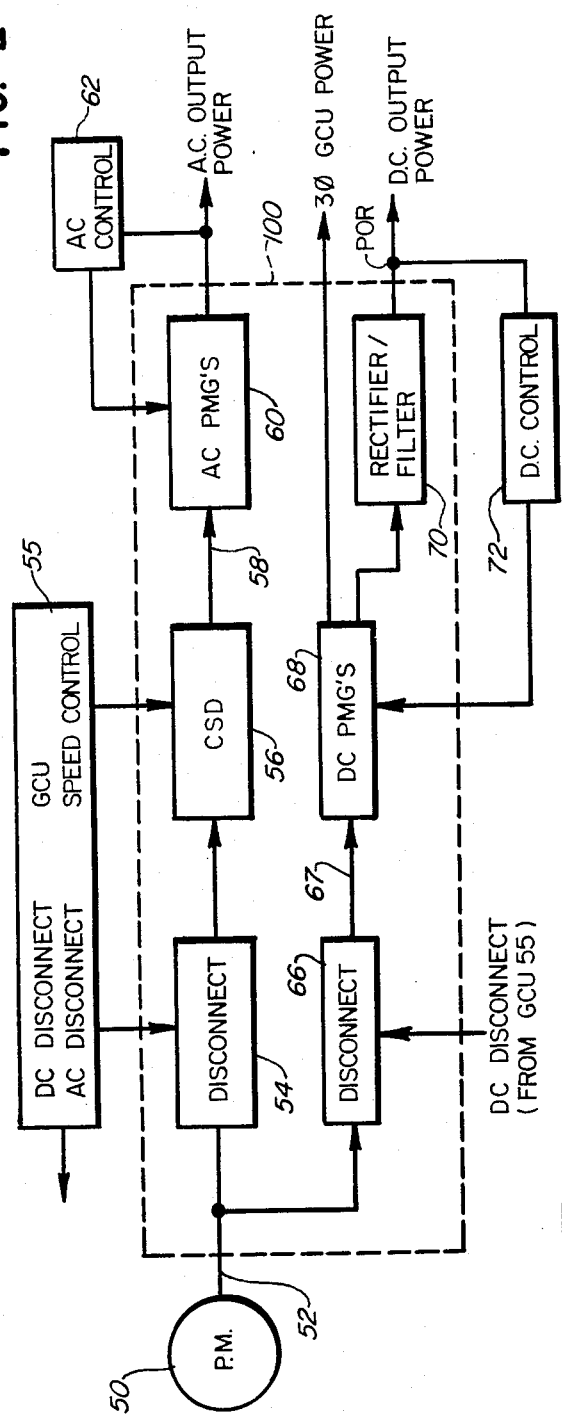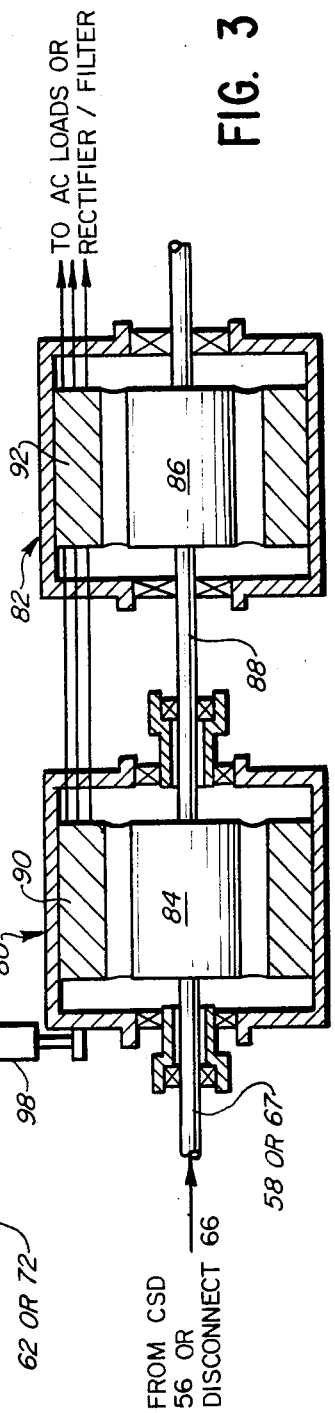

HYBRID GENERATING SYSTEM

DESCRIPTION

1. Technical Field

The present invention relates generally to generating systems, and more particularly to a generating system for producing highly reliable AC and DC output power from motive power produces by a prime mover.

2. Background Art

There are various applications in which a compact source of AC and DC power is required. One such application is in an aircraft which typically includes components requiring both types of power. Often in such aircraft, there are flight-critical or mission-critical multiple-channel redundant electrical systems which must be highly reliable, e.g. a probability of failure less than $10^{-9}$/flight hour. Since the probability of failure of one channel of a redundant electrical system is in turn dependent upon the reliability of the source of power to which it is connected, it follows that the source of power must have a probability of failure equal to or lower than the lowest specified probability of failure of the channels coupled thereto so that the number of redundant channels required to achieve system reliability will be minimized.

Prior systems for developing AC and DC power have included an AC generator driven by a source of motive power for developing the AC output power. A portion of the AC output power was rectified and filtered to create the DC output. This generating system, however, was not found to be sufficiently reliable, particularly in terms of the developed DC power since the reliability of the DC power was in turn dependent upon the reliability of the AC generator and the AC loads coupled thereto.

Moreover, it has been found in prior systems that when the proportion of DC power to the total output power developed by the AC generator becomes significant, distortion is introduced in the AC waveform due to the rectification process whereby the DC output power is developed. In some instances, specified power quality limits may not be achieved or the AC generator must be over-designed to keep the distortion below the specified limits. Further, the AC regulation is adversely affected by such distortion.

DISCLOSURE OF INVENTION

In accordance with the present invention, a hybrid generating system for generating AC and DC power from motive power developed by a prime mover includes an AC power generating section driven by the prime mover for generating the AC output power and a DC power generating section independent of the AC power generating section and driven by the prime mover for generating the DC output power.

In the preferred embodiment, each of the AC and DC power generating sections includes at least one and preferably two permanent magnet generators (PMG's), each of which includes series-connected stator or armature windings which develop a combined output and which are movable relative to one another to vary the magnitude of the combined output. The position of the stator windings is controlled in each section by a control circuit to regulate the output power developed thereby.

Preferably, both of the AC and DC sections are disposed in a single housing to provide a compact generating system. This also simplifies the cooling of the various generating components since the same cooling oil and oil pumps can be used for both sections.

Since the AC and DC generating sections are independent of one another, the reliability of both sections is increased since a failure in one section will not cause a failure of or disturbance in the power produced by the other section. Moreover, the independence of the two sections obviates the distortion problems noted above that arises in prior systems when the DC output power is a significant percentage of the total output power of the system. Further, the efficiency of the DC section is improved over prior systems since fewer components are required to generate the DC power.

BRIEF DESCRIPTION OF THE DRAWINGS

FIG. 2 is a block diagram of a hybrid generating system according to the present invention; and FIG. 3 is an elevational view, partly in section, of a dual permanent magnet generator utilized in either of the AC and DC sections shown in FIG. 2.

BEST MODE FOR CARRYING OUT THE INVENTION

Figure 1:
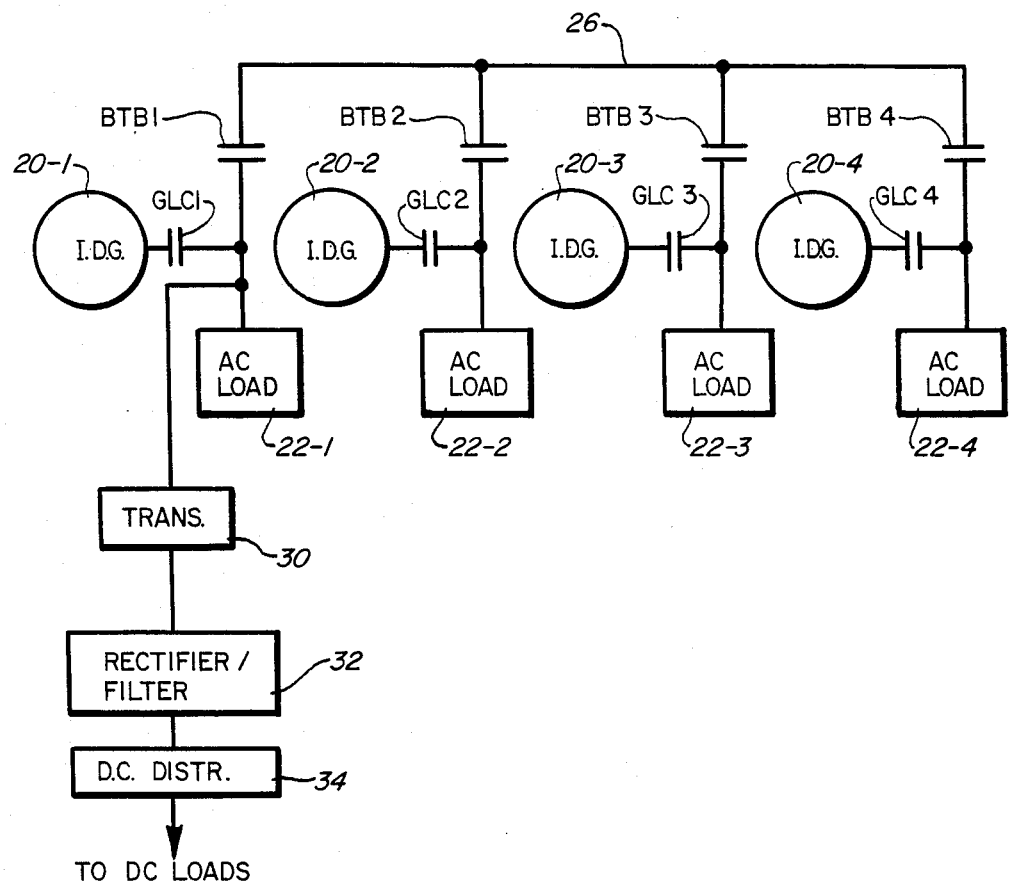
FIG. 1 is a block diagram of a prior art system for generating AC and DC power.

Referring now to FIG. 1, there is illustrated a prior art system for generating AC and DC power. The system includes a plurality of integrated drive generators 20-1 through 20-4, each of which develops AC power which is coupled to one of a plurality of AC loads 22-1 through 22-4 through generator line contactors GLC1-GLC4, respectively.

Each of the AC loads 22-1 through 22-4 is connected to a power distribution bus 26 through bus tie breakers BTB1-BTB4, respectively. Each of the AC loads may therefore be supplied power from one or more of the integrated drive generators 20-1 through 20-4.

Of course, a greater or lesser number of generators and/or loads may be coupled to the power distribution bus 26, if desired.

The integrated drive generators are controlled by a generator control unit (not shown). Each drive generator may comprise a constant speed drive driven by the source of motive power and a wound field generator for producing constant frequency AC power.

Devices may be provided to disable the generators in the event of a fault, if desired.

Coupled in parallel with one of the AC loads is a DC power section comprising a transformer 30, a rectifier/filter circuit 32 and a DC distribution system 34 for developing DC power to energize one or more DC loads.

As previously noted, this power generating system may be used in applications, such as aircraft, to energize critical DC loads which must meet high reliability standards. However, it can be seen that faults in the AC section can affect the DC power output, at least until the fault is isolated by the breakers in the AC section. This can lead to a temporary disruption in the DC power output which may result in a failure of operation of such critical DC loads.

It can also be seen that critical AC loads may also be affected by faults in the DC power system.

In summary, the reliability of the section producing the DC power in the system of FIG. 1 is dependent upon components in the section producing the AC power, and vice versa. The reliability of each section may therefore be reduced to an unacceptable degree.

Moreover, when the DC power is a significant proportion of the power developed by the drive generators 20, the rectification process of the rectifier/filter circuit 32 can introduce significant distortion in the AC output waveform coupled to one or more of the AC loads 22.

Referring now to FIG. 2, there is illustrated a block diagram of a hybrid generating system for generating AC and DC power according to the present invention. The hybrid generating system shown in FIG. 2 provides separate AC and DC power generating sections which, by virtue of their independence from one another, may each be more reliable than the individual power generating sections of the prior art system shown in FIG. 1.

As seen in FIG. 2, a prime mover 50 is coupled by means of a shaft, illustrated schematically at 52, to a mechanical AC disconnect unit 54 which is controlled by a disconnect signal provided by a generator control unit or GCU 55. The disconnect unit 54 is coupled to a constant speed drive (CSD) 56 which in turn receives a speed control signal from the GCU 55. The constant speed drive 56 develops a constant speed output which is transmitted via a shaft, shown schematically at 58, to an AC generator 60.

In the preferred embodiment, the AC generator 60 comprises a dual permanent magnet generating system (or "dual PMG system") which is described in greater detail in connection with FIG. 3 hereinafter. The dual PMG system 60 develops constant frequency AC output power from the constant speed motive power provided by the CSD 56.

The dual PMG system 60 is controlled by an AC control circuit 62 which senses the magnitude of the output voltage developed thereby and controls the dual PMG system to ensure that the output voltage is maintained at a constant value irrespective of load, within predetermined load limits. The control circuit 62 may also include current limiting circuitry for limiting maximum output current during fault conditions and is part of the GCU 55.

The elements 54, 56, 60 and 62, therefore, together comprise the AC section. A DC section is provided independent of the AC section for developing highly reliable DC output power. The DC section includes a manual DC disconnect unit 66 similar to the unit 54 described above which receives a disconnect signal from the GCU 55. The disconnect unit 66 is coupled to a second dual PMG system 68 which is functionally identical to the dual PMG system 60 described above. The output of the dual PMG system 68 is coupled to a rectifier/filter circuit 70 which develops the DC output power for energizing DC loads.

A DC control circuit 72 which is part of the GCU 55 is provided to sense the magnitude of the DC output voltage and to control the dual PMG system 68 for the DC section to maintain the DC output voltage at a desired level irrespective of speed changes in the motive power produced by the prime mover 50 and variations in DC load.

As noted more specifically below, each PMG in the DC dual PMG system 68 may include two independent sets of stator windings so as to develop two isolated outputs, one of which is coupled to the rectifier/filter circuit 70 and the other of which is used to provide control power to the GCU. This type of PMG, sometimes referred to as "segment wound", is described in greater detail in Vaidya U.S. patent application Ser. No. 744,887, filed June 14, 1985, entitled "Redundant Multiple Channel Electric Motors and Generators", assigned to the assignee of the instant application and the disclosure of which is hereby incorporated by reference.

Referring now to FIG. 3, each dual PMG system 60, 68 includes first and second permanent magnet generators 80, 82 having permanent magnet rotor structures 84, 86, respectively, which are coupled together by a shaft 88 so that both rotor structures 84, 86 are driven at the same rotational speed. The rotor structures 84, 86 and the shaft 88 are coupled, in the case of the dual PMG system 60, to the constant speed drive 56 via the shaft 58, and in the case of the dual PMG system 68, to the disconnect unit 66 via the shaft 67.

Each PMG 80, 82 of the dual PMG system 60 includes a set of three-phase armature windings 90, 92, each of which develops three-phase AC power. The armature windings 90, 92 are connected in series with each other and to the AC loads energized thereby.

In the case of the dual PMG system 68, the single set of three-phase armature windings 90, 92 are each replaced by two sets of three-phase armature windings, with each set being independent of the other set, as previously noted. In addition, one set of three-phase armature windings in one of the PMG's is coupled in series with one set of three-phase armature windings in the other PMG to produce a first output for providing control power to the GCU. The other sets of windings are coupled together in series to produce a second output which is coupled to the rectifier/filter circuit 70.

In both dual PMG systems 60, 68, the armature windings in the PMG 80 are movable relative to the armature windings in the PMG 82 by means of an actuator 98 which is operated by one of the control circuits 62, 72.

Since the armature windings of one PMG are connected in series with the armature windings of the other PMG, the total output of each dual PMG system 60, 68 is represented by the vector sum of the individual outputs of each PMG. The phase displacement of the output of one PMG relative to the other, and hence the magnitude of the combined output, may be adjusted by varying the position of the armature windings in the PMG 90 by means of the actuator 98 and the control 62 or 72.

In the case of the dual PMG system 60, the CSD 56 rotates the rotor structures 84, 86 at a constant rotational rate so that constant frequency AC power is developed in the armature windings 90, 92. The AC control 62 senses the magnitude of the voltage of the combined output of the PMG system 60 and adjusts the position of the armature windings 90 relative to the armature windings 92 to maintain the combined output voltage at a desired magnitude irrespective of changes in load.

In the case of the dual PMG system 68, the frequency of the power developed thereby is variable in dependence upon the speed of the shaft 67. This variation in frequency translates to a variation in magnitude in the DC output voltage developed by the rectifier/filter circuit 70. This magnitude variation is sensed by the DC control 72 which operates the actuator 98 to vary the placement of the armature windings of the PMG 80 relative to the PMG 82. The magnitude of the combined voltage developed by the dual PMG system 68 is therefore adjusted to maintain the magnitude of the DC output voltage at a constant level.

A more complete description of the dual PMG systems 60, 68, the AC control 62 and the DC control 72 may be had by reference to Glennon U.S. patent application Ser. No. 667,157 filed Oct. 31, 1984, entitled "Voltage Regulated Permanent Magnet Generator System", assigned to the assignee of the instant application and the disclosure of which is hereby incorporated by reference.

Referring again to FIG. 2, each of the elements shown therein with the exception of the prime mover 50 and controls 62, 72 may be provided within a single housing illustrated schematically by the dashed lines at 100 to provide a compact hybrid generating system. By providing the components in a single housing, the same oil and oil pumps can be used to cool the components, thereby simplifying the overall system.

Further, the efficiency of the DC section is also improved over prior generating systems since fewer components are required to generate the DC power.

Also, the independence of the AC and DC sections results in an increased reliability of the power developed by each section. Moreover, the quality of the AC output power is not affected by production of the DC output power, even when such power assumes a high proportion of the total output power of the AC and DC sections.

It should be noted that the dual PMG's described above having relatively-movable armature windings may be replaced by dual PMG's having relatively-movable rotor magnetic structures, if desired. In this event, appropriate controls would be needed to control the relative placement of the rotor structures to in turn achieve the desired control over the output power developed thereby.

I claim:

1. A hybrid generating system for generating AC and DC output power from motive power developed by a prime mover, comprising:
    an AC power generating section driven by the prime mover for generating the AC output power; and
    a DC power generating section independent of the AC power generating section and driven by the prime mover for generating the DC output power, wherein each of the AC and DC power generating sections includes a permanent magnet machine and wherein the AC power generating section includes first and second permanent magnet generators (PMG's) having armature windings connected in series with one another and first and second rotor magnetic structures mechanically coupled together wherein the armature windings of one PMG are movable relative to the armature windings of the other PMG to vary the magnitude of the AC output power voltage.

2. The hybrid generating system of claim 1, wherein the prime mover develops variable speed motive power and wherein the AC power generating system further includes a constant speed drive coupled between the prime mover and the PMG's for driving the first and second rotor magnetic structures at a constant speed whereby the series-connected armature windings develop constant frequency AC output power.

3. The hybrid generating system of claim 1, wherein the AC power generating system further includes means for adjusting the relative placement of the armature windings of the first and second PMG's so that the AC output power voltage is maintained at a predetermined magnitude irrespective of load current.

4. A hybrid generating system for generating AC and DC output power from motive power developed by a prime mover, comprising:
    an AC power generating section driven by the prime mover for generating the AC output power; and
    a DC power generating section independent of the AC power generating section and driven by the prime mover for generating the DC output power, wherein each of the AC and DC power generating sections includes a permanent magnet machine and wherein the DC power generating section includes first and second permanent magnet generators (PMG's) having armature windings connected in series with one another and first and second rotor magnetic structures mechanically coupled together wherein the armature windings of one PMG are movable relative to the armature windings of the other PMG to vary the magnitude of the DC output power voltage.

5. The hybrid generating system of claim 4, wherein each PMG is segment wound whereby two sets of independent armature windings are disposed in each PMG, one set of armature windings in each of the PMG's being connected together in series and developing a first output and the remaining sets of windings being connected together in series and developing a second output, one of the outputs being rectified to develop the DC output power.

6. The hybrid generating system of claim 4, wherein the prime mover develops variable speed motive power which is coupled to the PMG's such that the PMG's develop variable frequency AC power, and wherein the DC power generating section includes means for adjusting the relative placement of the first and second PMG's as a function of the DC output power voltage to maintain such voltage at a predetermined magnitude.

7. A hybrid generating system for generating AC and DC output power from motive power developed by a prime mover, comprising:
    an AC power generating section including
        a constant speed drive (CSD) coupled to the prime mover for developing constant speed motive power,
        a first permanent magnet generating (PMG) system coupled to the CSD for generating the AC output power at a fixed frequency and
        means for adjusting the first PMG system so that the AC output power voltage is maintained at a predetermined magnitude irrespective of changes in load current; and
    a DC power generating section including
        a second permanent magnet generating (PMG) system independent of the first PMG system and coupled to the prime mover for generating variable frequency AC power,
        means for rectifying and filtering the variable frequency AC power to develop the DC output power and
        means for adjusting the second PMG system in dependence upon the DC output power voltage to maintain such voltage at a predetermined magnitude irrespective of changes in prime mover motive speed.

8. The hybrid generating system of claim 7, wherein the AC and DC power generating systems are disposed in a single housing.

9. The hybrid generating system of claim 7, wherein the PMG system in the AC power generating section includes first and second permanent magnet generators (PMG's) having armature windings connected in series with one another and first and second rotor magnetic structures mechanically coupled together wherein the armature windings of one PMG are movable relative to the armature windings of the other PMG to vary the magnitude of the AC output power voltage.

10. The hybrid generating system of claim 7, wherein the PMG system in the AC power generating section includes first and second permanent magnet generators (PMG's) having armature windings connected in series with one another and first and second rotor magnetic structures mechanically coupled together wherein the armature windings of one PMG are movable relative to the armature windings of the other PMG to vary the magnitude of the DC output power voltage.

11. The hybrid generating system of claim 10, wherein each PMG is segment wound whereby two sets of independent armature windings are disposed in each PMG, one set of armature windings in each of the PMG's being connected together in series and developing a first output and the remaining sets of windings being connected together in series and developing a second output, one of the outputs being rectified to develop the DC output power.

12. A hybrid generating system for generating AC and DC output power from motive power developed by a prime mover, comprising:
  an AC power generating section including
    a constant speed drive (CSD) coupled to the prime mover for developing constant speed motive power,
    a first dual permanent magnet generating system coupled to the CSD for generating the AC output power comprising first and second permanent magnet generators (PMG's) having armature windings connected in series with one another and permanent magnet rotor structures mechnically coupled together wherein the armature windings of one PMG are movable relative to the armature windings of the other PMG to vary the magnitude of the AC output power voltage and
    first means for adjusting the position of the armature windings of one PMG relative to the position of the other armature windings so that the AC output power voltage is maintained at a predetermined magnitude irrespective of the current in such windings;
  a DC power generating section including
    a second dual permanent magnet generating system coupled to the prime mover comprising third and fourth PMG's having armature windings connected in series with one another and permanent magnet rotor structures mechanically coupled together wherein the armature windings of one PMG are movable relative to the armature windings of the other PMG to vary the magnitude of the combined output voltage developed by both PMG's,
    means for rectifying the combined output of both PMG's to develop the DC output power and
    second means for adjusting the position of the armature windings of one of the third and fourth PMG's relative to the position of the armature windings of the other PMG in dependence upon the DC output power voltage so that the DC output power voltage is maintained at a predetermined magnitude irrespective of changes in the speed of the prime mover; and
  a single housing for enclosing the AC power generating section and the DC power generating section.

13. The hybrid generating system of claim 12, wherein each of the first and second adjusting means comprises and actuator coupled to a PMG for varying the placement of the PMG armature windings and a control which senses the AC or DC power output for operating the actuator.

14. The hybrid generating system of claim 12, wherein each of the third and fourth PMG's are segment wound whereby two sets of independent armature windings are disposed in each PMG, one set of armature windings in each of the PMG's being connected together in series and developing a first output and the remaining sets of windings being connected together in series and developing a second output, one of the outputs being rectified to develop the DC output power.

* * * * *